Aug. 19, 1952     G. W. JOHNSON     2,607,072
FEATHER PLUCKING APPARATUS FOR POULTRY

Original Filed Aug. 6, 1943     5 Sheets-Sheet 1

INVENTOR,
Gordon W. Johnson.
BY Roy E. Hamilton, Attorney.

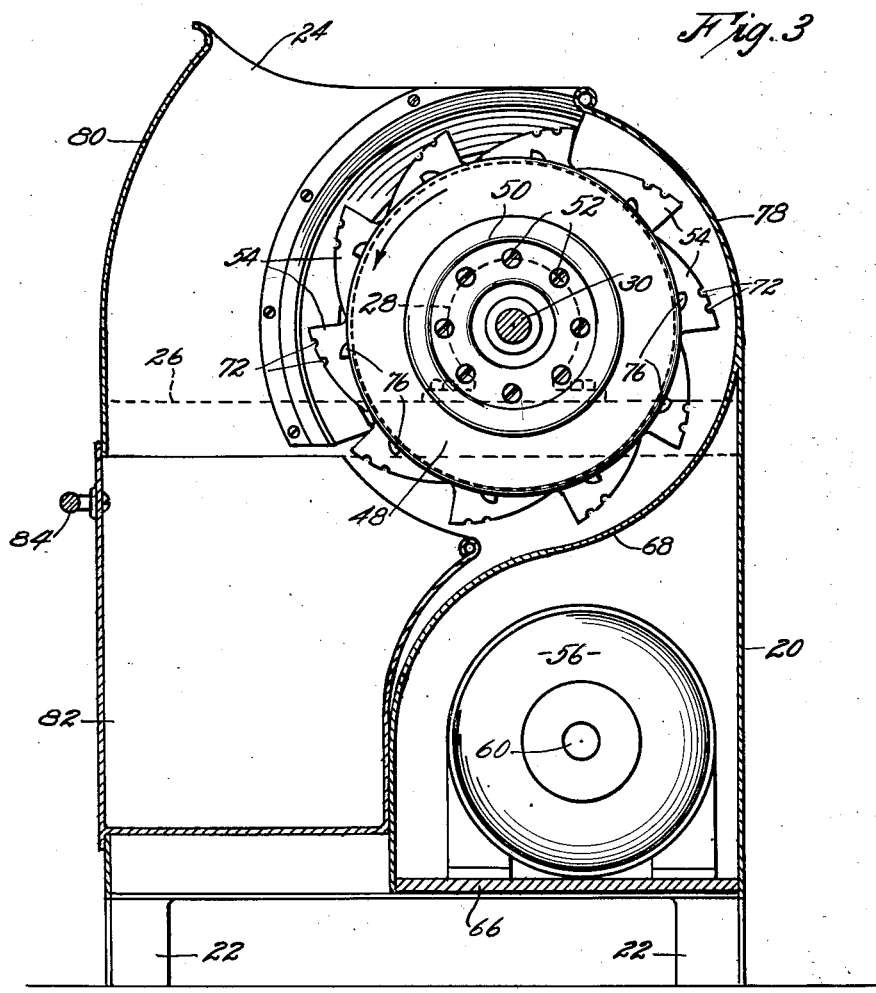
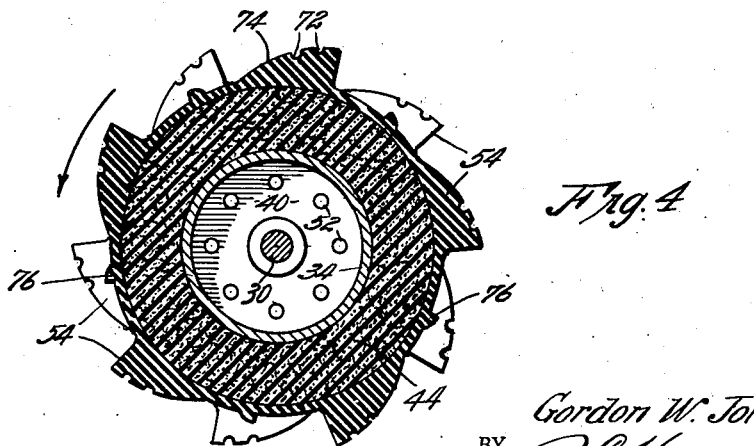

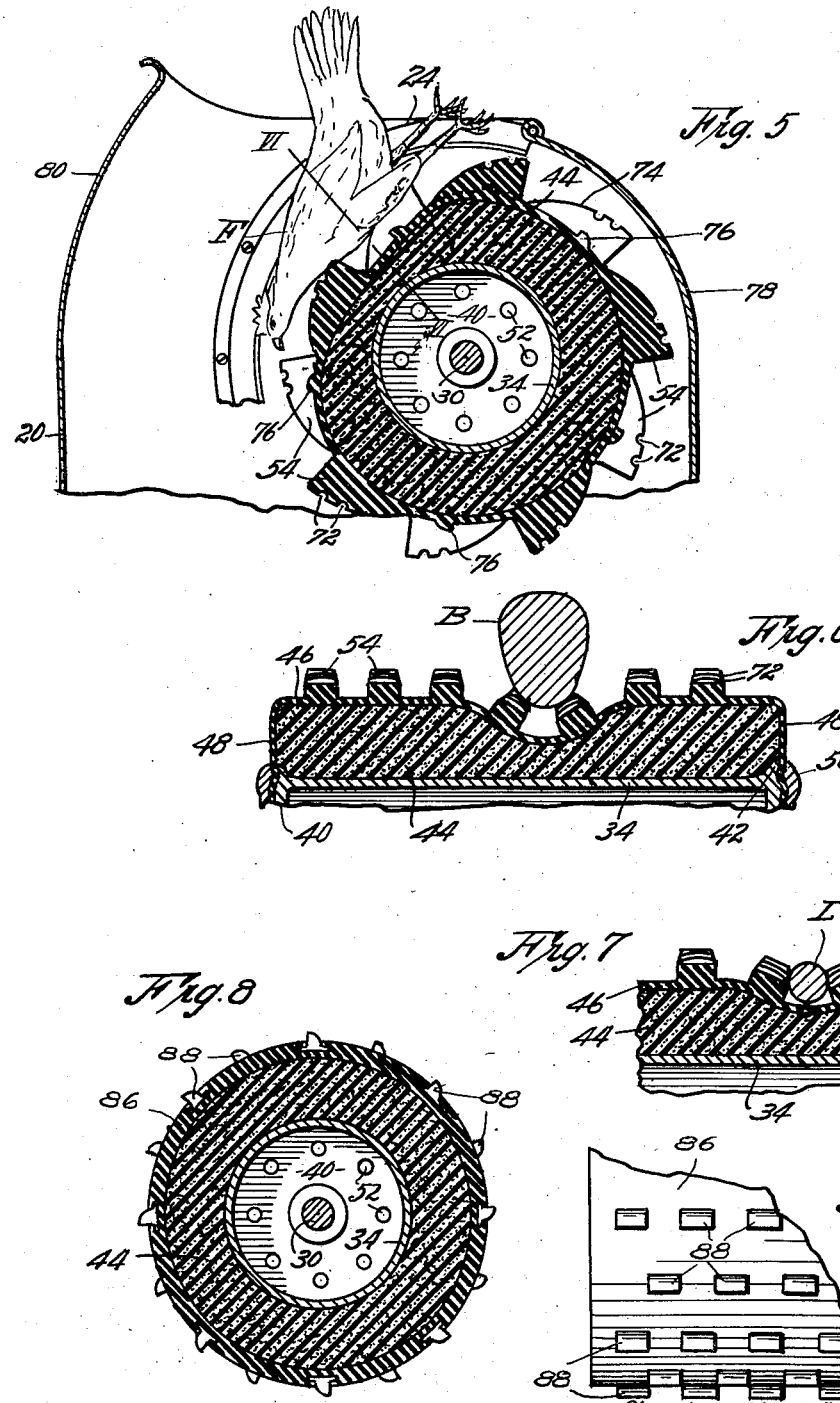

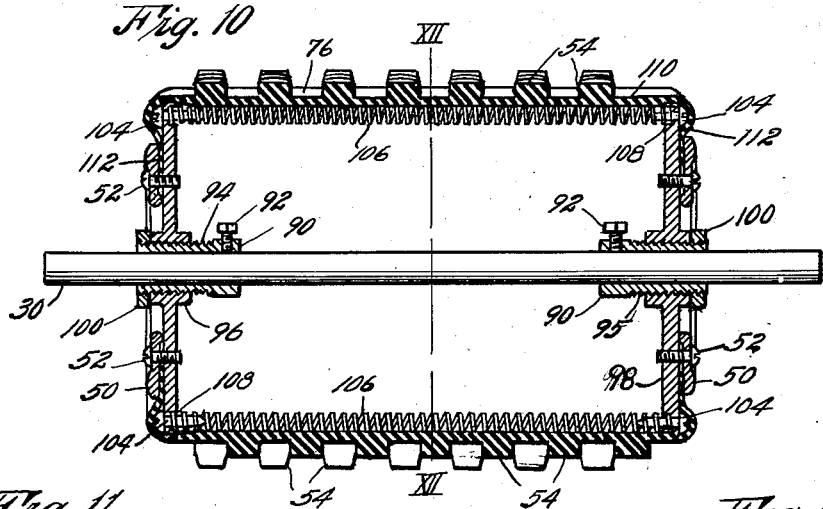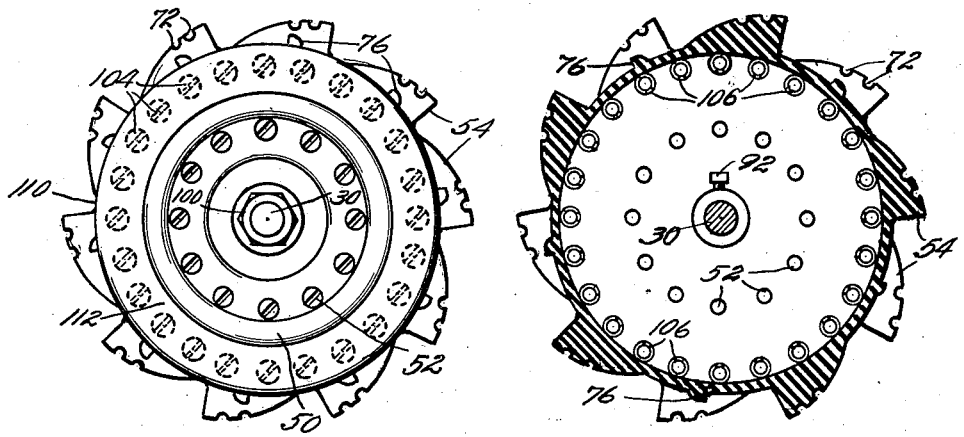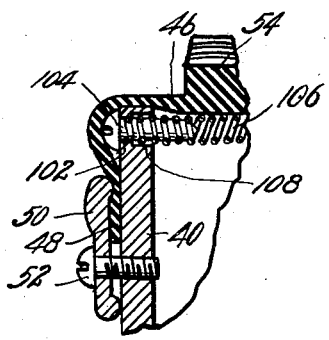

Aug. 19, 1952 G. W. JOHNSON 2,607,072
FEATHER PLUCKING APPARATUS FOR POULTRY
Original Filed Aug. 6, 1943 5 Sheets-Sheet 5

INVENTOR.
Gordon W. Johnson,
BY Roy E. Hamilton, Attorney.

Patented Aug. 19, 1952

2,607,072

UNITED STATES PATENT OFFICE 2,607,072

FEATHER PLUCKING APPARATUS FOR POULTRY

Gordon W. Johnson, Raytown, Mo., assignor to Gordon Johnson Company, Kansas City, Mo., a corporation of Missouri Substituted for application Serial No. 498,830, August 6, 1943. This application June 8, 1951, Serial No. 230,670

10 Claims. (Cl. 17—11.1)

This application is a substitute for my prior application, Serial No. 498,830, filed August 16, 1943, now abandoned.

This invention relates to improvements in feather plucking apparatus for poultry or the like and is particularly directed to a machine that will rapidly and thoroughly remove the feathers from the fowl without bruising, scuffing or otherwise damaging the carcass.

Much difficulty has been experienced with the present rotary type feather plucking devices since the bendable feather engaging fingers now being used are too severe in their action and cause a bruising and scuffing of the carcass that is objectionable.

The principal object of the present invention is the provision of a feather plucking apparatus having a rotatable member provided with a resilient peripheral bed carrying feather engaging lugs which can be readily adjusted radially by exerting a pressure against said lugs.

Another object of the present invention is the provision of a feather plucking apparatus having feather engaging lugs adapted to be bodily compressed into a resilient bed as a carcass is pressed thereagainst, whereby the lugs are positioned to conform to the contour of the carcass.

A still further object of this invention is the provision of a feather picking apparatus having a rotary drum with a resilient peripheral bed and means to vary the degree of resiliency of said bed.

Other objects are simplicity and economy of construction, ease and efficiency of operation and adaptability for use to meet the requirements in plucking feathers from the various types of fowls.

Reference will now be had to the drawings wherein:

Fig. 3 is a sectional view taken on line III—III of Fig. 1.

Fig. 4 is a cross sectional view of the rotatable drum taken on line IV—IV of Fig. 1.

Fig. 5 is a fragmentary sectional view of the apparatus showing a chicken carcass positioned in the operative position thereon.

Fig. 6 is a fragmentary sectional view taken on line VI—VI of Fig. 5.

Fig. 7 is a fragmentary sectional view similar to that shown in Fig. 6 showing a leg of the fowl in a typical position for picking.

Fig. 8 is a sectional view of a rotary drum showing a modified form of the feather engaging lugs.

Fig. 9 is an elevational view of a portion of the rotary drum shown in Fig. 8.

Fig. 10 is a longitudinal sectional view of a modified form of the rotary drum wherein coil springs are utilized to form the resilient bed.

Fig. 11 is an end elevation of the drum shown in Fig. 10.

Fig. 12 is a sectional view taken on line XII—XII of Fig. 10.

Fig. 13 is an enlarged fragmentary sectional view showing the spring anchoring means.

Fig. 14 is an elevational view partly broken away of the drum axle with the right and left hand threaded sleeves shown in elevation thereon.

Figure 1:
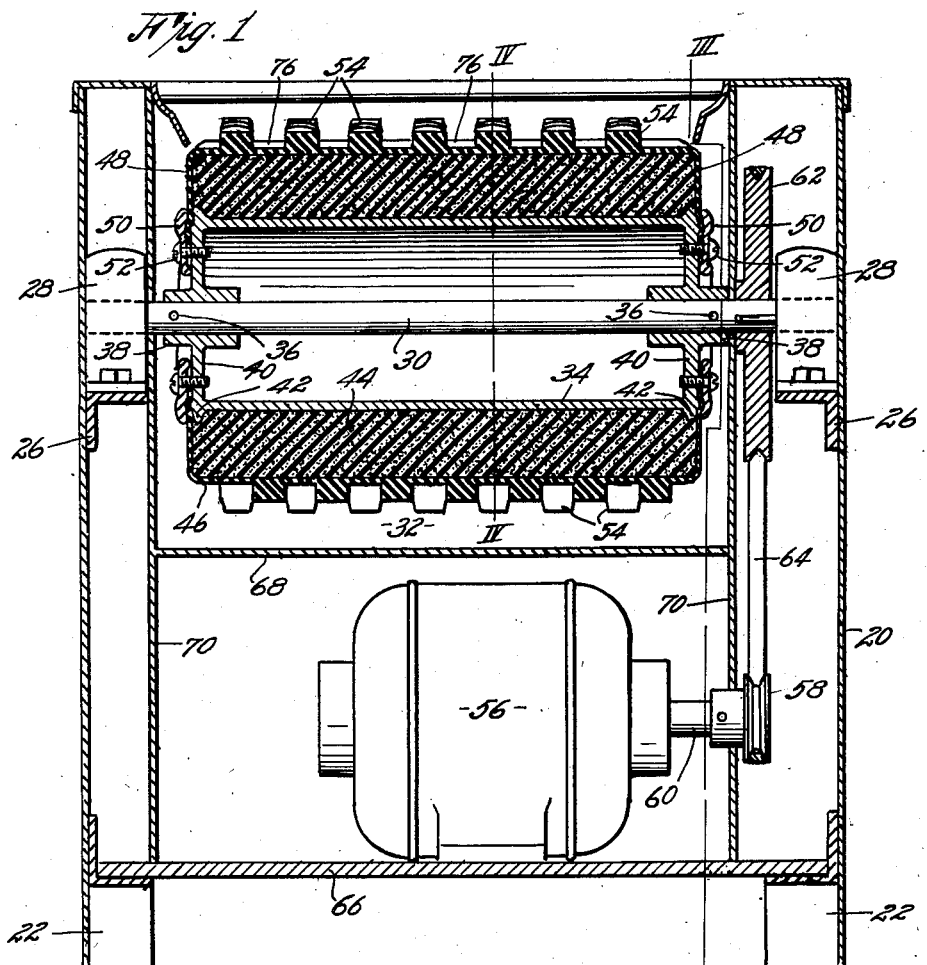
Fig. 1 is a front view partly in section of a feather plucking apparatus embodying this invention.

Reference will now be had to the drawings wherein, like reference characters designates similar parts throughout the several views and the numeral 20 designates a housing supported on legs 22 and having an opening 24 at its upper extremity for admitting the carcasses to be plucked. Brackets 26 are rigidly supported by housing 20 and carry bearing members 28 of any suitable type in which the drum shaft 30 is mounted for rotation. A rotatable member 32 includes a metal drum 34 which is rigidly attached to shaft 30 by means of pins 36. These pins pass through hub members 38 which are concentrically formed on the cylinder ends 40. Drum 34 is flanged at 42. Mounted on drum 34 and extending entirely therearound is a relatively thick band or ring 44 to form a bed of resilient material such as sponge rubber which may be cemented or otherwise secured against relative movement to said drum. This resilient bed extends substantially the full length of drum 34 and its periphery is disposed concentrically with the axis of rotation of said drum.

An elastic blanket 46 of substantially cylindrical shape and having inturned flanges 48 is adapted to encompass the outer periphery and end portions of the resilient bed 44. The inner portion of flanges 48 extend over the end portions 40 of the drum 34 and are secured thereto by means of clamp rings 50 which are forced thereagainst by means of the adjusting screws 52 which extend through the rings 50 and are threaded into the end walls 40 of the drum. If deemed necessary this blanket or covering 46 may be cemented to the sponge-rubber cushioning band 44. The elastic blanket 46 is provided with outwardly extending lugs or projections 54 which are preferably moulded integral with the blanket for engaging the feathered portion of the carcass being plucked.

Figure 2:
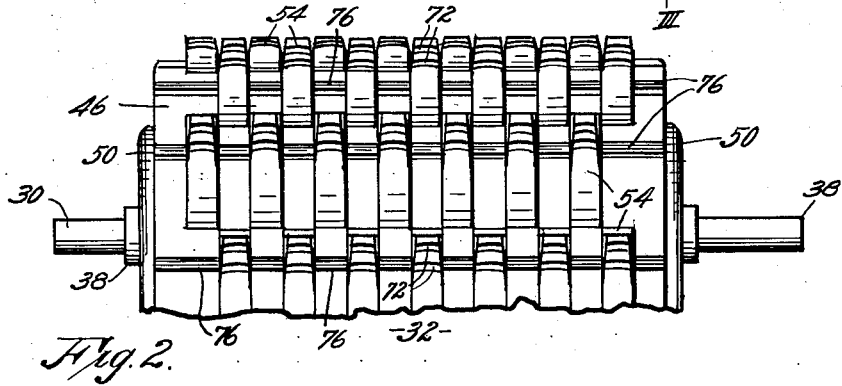
Fig. 2 is a fragmentary elevational view of the rotatable drum.

Referring to Figs. 1 and 2, it will be observed that the lugs 54 are arranged in spaced apart relation and in longitudinal rows. There are a plurality of these rows of lugs and adjacent rows are offset longitudinally as shown.

The rotary member 32 is adapted to be driven in the direction indicated by the arrow in Fig. 4 by means of a motor 56 which is provided with a drive pulley 58 mounted on the motor shaft 60 and interconnected with drum pulley 62 by means of a belt 64. The motor 56 is mounted on a shelf 66 carried by housing 20 and is shielded from the rotatable member by means of a shield 68 which forms a partition therebetween. It will also be noted that the bearings 28, pulleys 58 and 62 and belt 64 are also protected from the rotary member by means of vertical partitions 70. The lugs 54 are inclined inwardly to the direction of travel and are provided with transverse slots 72 on their inclined working surfaces 74. These transverse slots may be arcuate or otherwise formed to present a proper series of feather engaging edges to contact the carcass.

By referring to Fig. 5 wherein a fowl F is shown in position to be plucked, it is to be understood that the operator supports the fowl in substantially the position shown, exerts pressure thereagainst and manipulates the bird to expose all portions thereof to the rubbing action of the lugs 54. When the fowl is thus positioned on the rotary member it will be noted that the resilient bed will be compressed so that the lugs 54 will be positioned properly to contact the irregular contour of the fowl's carcass. It is to be understood that the fowl may be positioned in any manner best suited for the particular type of fowl and the type of work to be done.

By referring to Figs. 6 and 7, it will be observed that the lugs contacting the carcass will not only be compressed into the resilient bed but will also be moved toward each other at their outer extremities to cause a clamping effect against the smaller portions such as the neck or leg of the fowl thereby producing a very effective feather removing action. This action of the lugs on the body portion B is best shown in Fig. 6 and the action on the smaller portions of carcass L is shown in Fig. 7.

Referring to Figs. 4 and 5, it will be noted that the lugs 54 are disposed in spaced apart relation and in annular rows. The space between adjacent lugs exposes the blanket to considerable wear and it has been found expedient to provide transverse ribs 76 between adjacent lugs to extend and connect together the lugs adjacent the annular row of lugs just referred to. These ribs 76 not only protect the thinner portions of the blanket but also serve to pluck feathers from the smaller portions of the carcass which tend to bridge across adjacent lugs of a given circular row. The position that the fowl is held relative to the rotating member is optional with the operator as is also the pressure at which the fowl is pressed against the lugs. It will be apparent that the operator stands adjacent the front wall 78 of the apparatus and that the rear wall 80 is curved and extends slightly above the front wall to prevent the discharge of feathers, etc. from the machine.

Referring now to Fig. 3, it will be observed that a removable feather container 82 having a handle 84, is normally positioned to receive the feathers from the rotatable member. This feather container is especially useful for occasional picking. However, when long runs are made it may be desirable to remove this container and permit the feathers to pass directly through the machine to any type of conveyor that might be provided.

Reference will now be had to the modified form shown in Figs. 8 and 9 wherein the principal variation is in the blanket 86 provided with feather engaging lugs 88. It will be noted that these lugs are embedded in the blanket 86 so that they can be made of a different material, that is a material of different degrees of hardness and texture than the blanket itself. These lugs 88 may be arranged in any suitable manner to best facilitate the particular type of feather plucking to be done. The shape of lugs 88 may be similar to lugs 54 or any other shape to facilitate proper plucking of the feathers without injury to the carcass.

Reference will now be had to Figs. 10, 11, 12, 13 and 14 wherein is shown a modified form of the rotatable member which is adapted to be installed in the same apparatus and driven in like manner as the rotatable member 32. This rotatable member comprises the shaft 30 on which is adjustably mounted spaced apart sleeves 90 provided with set screws 92 by means of which the sleeves are maintained in predetermined fixed positions on the shaft. The outer portions of sleeves 90 are threaded to receive the threaded hubs 96 of the end discs 98. One of these sleeves is provided with a right hand thread 94 and the other with a left hand thread 95, thus making it possible to move the discs toward and from each other by rotating them in the same direction.

Lock nuts 100 are provided to prevent accidental movement of the discs on the sleeves. Each disc has a like series of holes 102 to receive screws 104 which in turn engage the convolutions of a helical spring 106 which extends from one disc to the other parallel with the shaft 30. It has been found convenient to have the end portions of the springs 106 project into recesses 108 formed in the discs concentric with holes 102 (see Fig. 13). These springs 106 are preferably equally spaced so as to present a resilient bearing for the elastic blanket 110. This blanket is flanged at 112 to overlap the end discs and to extend beneath the clamping rings 50 by means of which they are clampingly held when the screws 52 are set. This blanket is provided with feather engaging lugs 54 similar to those shown in Fig. 1. When it is desired to vary the resiliency of the spring bed, the operator simply adjusts the end discs on the sleeves 90. By moving these discs apart the tension will increase and should it be found advisable to lessen the tension the discs may be moved closer together. This type of resilient bed functions somewhat similar to the sponge-rubber bed shown in Fig. 1 and also permits of a variation in the resiliency of the bed by tightening or loosening said springs.

Figure 15:
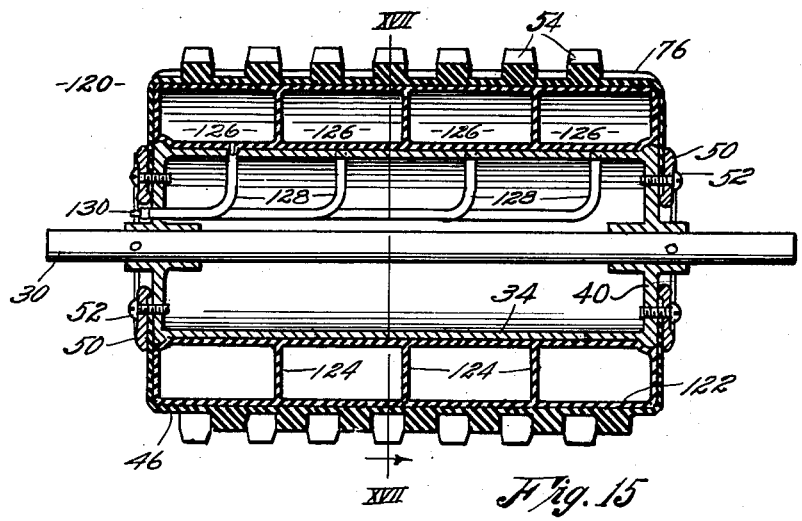
Fig. 15 is a longitudinal sectional view of a further modification of the rotary member wherein the resilient bed is made of pneumatic chambers.
Figures 16, 17:
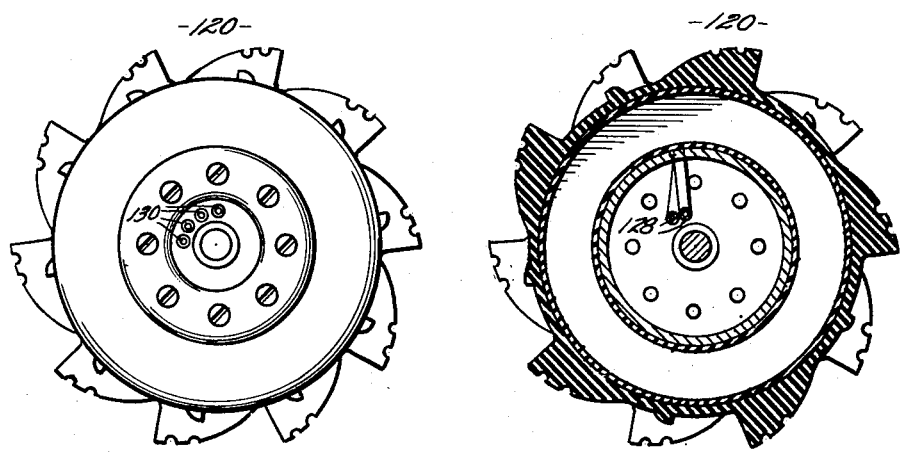
Fig. 16 is an end elevation of the rotary member shown in Fig. 15.
Fig. 17 is a cross sectional view taken on line XVII—XVII of Fig. 15.

The modified form shown in Figs. 15, 16 and 17 differs from that shown in Fig. 1 in that the resilient bed of the rotatable member 120 contemplates the use of a pneumatic resilient bed for the support of the lug carrying elastic blanket 46. This pneumatic bed comprises a pliable housing 122 made of any suitable pliable material such as rubberized fabric, rubber, or any other suitable material impervious to air. This housing 122 is provided with one or more annular partitions 124 which serve to divide the housing chamber into a plurality of annular chambers 126. Each one of these chambers is provided with a filling tube 128 having a suitable valve 130. Each of the chambers 126 is independently inflatable, thus making it possible to vary the compressibility of the particular annular portions of the rotary member. By this means it is apparent that the operator will be able to so inflate the various chambers as to produce different picking effects suitable for the varying condition of the carcass during the picking operation. For instance, at the start of the picking operation, it may be desirable to provide a less resilient base than is needed during the finishing operation.

The filling tubes 128 are shown extending through end plate 40 of the cylinder with the valves 130 exposed for inflation and deflation.

In all forms shown the principal feature considered is the production of a rotary member carrying feather engaging lugs which are mounted on a resilient peripheral base that is adapted to be compressed by the action of the carcass thereagainst to permit the lugs to be positioned to properly contact the irregular contour of the carcass. The resilient property of the underlying bed and the centrifugal force acting on the rotating lugs, tends to normally maintain the operating surface of the rotary member in cylindrical form and this cylindrical form is distorted only when the carcass is pressed thereagainst. The degree of depression of the resilient bed depends upon the pressure exerted thereagainst and by varying the depth of the resilient bed the carcass may be embedded in the rotary member to various degrees.

These different feather-plucking machines are also adapted for use in removing wax from the carcasses, when a coating of wax is used for removing the final feathers and pin feathers in the picking operation.

From the foregoing description it is very apparent that many minor variations in structure and operation may be made without departing from the scope of the invention as set forth in the following claims.

Having thus described the invention, what is claimed as new and desired to be secured by Letters Patent is:

1. A feather plucking apparatus comprising a rotatable member having an annular series of coil springs at its periphery, and an undulated resilient member positioned on said series of springs, whereby when a carcass is forced against said undulated resilient member the adjacent springs of said series will be depressed.

2. A feather plucking apparatus comprising a rotatable member, a series of coil springs disposed parallel to the axis of said rotatable member and carried thereby, a band of resilient material having outwardly projecting feather engaging means on the surface thereof carried by said series of coil springs.

3. A feather plucking apparatus comprising a rotatable cylindrical member having a pneumatic peripheral portion mounted thereon, said pneumatic peripheral portion having a plurality of transversely disposed independently inflatable chambers, and transversely and circumferentially spaced apart feather engaging lugs of relatively hard elastic material carried by and extending outwardly from the outer wall of said pneumatic peripheral portion and adapted to be extended radially into said pneumatic portion by a feathered carcass pressed thereagainst.

4. A feather-plucking apparatus comprising a rotatable cylindrical member, having a resilient support at its periphery, an elastic blanket carried on said resilient support and having a plurality of outwardly projecting feather engaging lugs having working faces inclined inwardly to the direction of travel of the cylindrical member.

5. A feather-plucking apparatus comprising a rotatable cylindrical member, having a resilient support at its periphery, an elastic blanket carried on said resilient support and having a plurality of outwardly projecting feather engaging lugs having working faces inclined inwardly to the direction of travel of the cylindrical member, and having transverse grooves formed in said working faces.

6. In a feather-plucking apparatus a rotatable cylindrical member having a resilient support at its periphery, a pliable sheet carried by said resilient support, a plurality of spaced apart lugs carried by said pliable sheet, each lug having an undulated working surface adapted to engage a feathered carcass and remove the feathers therefrom as said cylindrical member is rotated.

7. In a feather-plucking apparatus a rotatable cylindrical member having a resilient support at its periphery, a pliable sheet carried by said resilient support, a plurality of spaced apart lugs carried by said pliable sheet adapted to be successively positioned to contact the irregular contour of a fowl carcass as the cylindrical member is rotated.

8. A feather-plucking apparatus comprising a substantially cylindrical rotatable member having a relatively thick resilient peripheral bed, an elastic sheet carried by said resilient bed and having lugs adapted to be moved bodily into said resilient bed as a feathered carcass is pressed thereagainst whereby the lugs will follow the irregular contour of the carcass.

9. A feather-plucking apparatus comprising a rotatable member having a cylindrically formed pneumatic peripheral member mounted thereon, and transversely and circumferentially spaced apart feather engaging lugs of relatively hard elastic material carried by and extending outwardly from said pneumatic member.

10. A feather-plucking apparatus comprising a rotatable member, an annular rubber cushion carred by said rotatable member, and a tubular elastic member of relatively hard rubber mounted on said cushion and having feather engaging means extending outwardly therefrom.

GORDON W. JOHNSON.

No references cited.